United States Patent Office 3,235,370
Patented Feb. 15, 1966

3,235,370
METHOD OF PREPARING STABLE UREA-FORM-
ALDEHYDE SUSPENSION AND PRODUCT
Joseph P. Kealy, Calumet City, Ill., assignor to Swift &
Company, Chicago, Ill., a corporation of Illinois
No Drawing. Filed Oct. 21, 1964, Ser. No. 405,606
9 Claims. (Cl. 71—29)

This application is a continuation-in-part of my application, Serial Number 132,312, filed August 18, 1961, and now abandoned.

The present invention relates in general to the preparation of useful fertilizer ingredients. More particularly my invention is directed to the method of preparing a stable suspension of urea and formaldehyde which is eminently suited for incorporation in an acidic fertilizer substrate to prepare a mixed fertilizer, to the novel mixture to produce the suspension, the suspension itself, and the resultant mixed fertilizer.

Fertilizer manufacturers are continually seeking means for producing a mixture of fertilizer ingredients having large amounts of nitrogen in agronomically available form. To this end, salts containing nitrogen have been admixed with or formed in superphosphate mixtures; phosphoric acid containing materials have been ammoniated, etc. An especially suitable source of nitrogen, either alone or in conjunction with other nitrogen-supplementing materials, is the class of resinous materials known interchangeably as "ureaform," "urea-formaldehyde condensation products," or "water-insoluble urea-formaldehyde polymers." These terms apply to the said catalyzed reaction product of urea and formaldehyde having a mol ratio of urea to formaldehyde of at least 1 to 1. The product contains nitrogen in a water-insoluble but slowly available form and is, therefore, not leached out in the soil immediately following application to growing plants. A further advantageous feature of the water-insoluble ureaform polymer as a nitrogen source in fertilizer mixtures is in the fact that it shows no tendency to burn plant leaves through plasmolysis. Many of the commonly used fertilizer salts effect a burn or discoloration and a debilitation of plants when applied thereto. A discussion of which chemical sources of nitrogen cause plasmolysis will be found in United States Patent No. 2,827,368, Everett N. Mortenson et al., issued March 18, 1958, entitled, "Non-Burning Plant Fertilizer."

Fertilizers containing ureaform have been prepared in a variety of ways. The solid water-insoluble urea-formaldehydes polymers have been prepared and admixed with other fertilizer solids such as superphosphates (usually ammoniated), potassium nitrate, potassium sulfate, ammonium nitrate, potassium chloride, etc. The ureaform polymers have also been prepared in situ when formulating fertilizer mixtures, and preferably at the time when superphosphates are being ammoniated. In one such in situ process urea is charged into a chamber containing superphosphates and a source of formaldehyde is injected into the chamber. The acidity of the substrate and the heat therein initiates the urea-formaldehyde condensation reaction in the mixing chamber. The heat from the exothermic neutralization reaction which occurs if the acidic solids are simultaneously being ammoniated also aids continuation of the condensation reaction, which is exothermic itself. In the in situ manufacture of ureaform, pH of the substrate, product temperature, and urea to formaldehyde mol ratio dictate the quality of the polymer formed with respect to its nitrogen availability, and, therefore, its agronomic usefulness. The importance of these variables and their interrelationship are disclosed and explained in U.S. Patent No. 2,955,390, issued October 11, 1960, to Joseph P. Kealy.

As disclosed and explained in U.S. application Serial No. 14,126 of Joseph P. Kealy et al., and now U.S. Patent No. 3,119,683, problems arise in the type of in situ manufacture of ureaform previously described, e.g., (1) less than totally efficient urea to formaldehyde reaction because of insufficient water in the system to dissolve the urea and (2) the necessity to carefully control temperature of the product. The aforementioned Patent No. 3,119,683 discloses methods for solving these problems by adding a particular solution containing urea and formaldehyde in the proportions desired in the final mixed fertilizer product to a zone containing solid fertilizer materials. This solution has a urea to formaldehyde mol ratio of 1 to 1 up to 2.75 to 1, 25% or less water, a pH above about 6 (preferably 6.8–7.2) and a temperature between about 30–250° F.

While an advance in the art of in situ ureaform manufacture, the solution used in the Kealy et al. Patent No. 3,119,683 has the drawback of being substantially unstable after about 24 hours and oftentimes in a lesser period of time. By "unstable" I mean that excessive precipitation prevents pumping of the solution. This instability of the solution necessitates substantially in-line preparation of the solution and rather strict time control on the manufacturing operations, decreasing flexibility of the process. It is the principal object of my invention to overcome this drawback and to provide a substantially stable solution of urea and formaldehyde.

An additional object of my invention is to provide a method for producing a solution of urea and formaldehyde having a mol ratio of at least 1 to 1, which solution will be stable for at least about 30 days.

A further object of my invention is to provide a mixed fertilizer product having a low uncombined urea content wherein the major amount of the agronomically useful nitrogen is supplied by ureaform.

Further objects and advantages will become apparent to those skilled in the art from the following description of my invention.

I have discovered that a novel suspension of substantially reacted urea and formaldehyde having substantially no free formaldehyde that will remain stable, i.e., will remain a flowable mixture at ambient temperature, for at least 30 days, and in many cases up to six months or more, can be prepared by carefully controlling the initial pH of the suspension, the amount of charged solids, the urea to formaldehyde mol ratio, the reaction time and temperature in preparing the suspension, and the amount of water present. Since the suspension contains substantially reacted components, the heat of the exothermic reaction of urea with formaldehyde is not added to the fertilizer mixture when the fluid suspension is added thereto, thus minimizing temperature problems. (See both previously referred to Kealy patents for a discussion of the importance of controlling temperature in the preparation of a ureaform product having a high availability index.)

To prepare the stable suspension of my invention I first prepare a flowable mixture of urea, formaldehyde, water, and between about 1–2 mols of an upwardly pH adjusting material for every 40 mols urea. This amount of pH adjusting material will generally impart an initial pH of at least about 10–11 to said mixture and preferably about 13 or above. The flowable mixture so formulated is then maintained for a reaction period at a temperature of between about 85° C. and boiling after which the resultant reacted mixture is cooled to about room temperature.

More specifically in the practice of my inventive method, I may first dilute a strong formaldehyde source with water. For example, solid paraformaldehyde may be dissolved with water. The pH of this diluted formaldehyde source is then adjusted to the range of about 10–14 and the solution thoroughly mixed. To the pH adjusted mixture a sufficient quantity of urea is added to bring the total urea to a formaldehyde mol ratio of the mixture within the range of about 1.3–2.75 to 1 preferably 1.6–1.8 to 1. The amount of water initially used to dilute the formaldehyde source is at least that amount sufficient to provide enough liquid in the system to dissolve any added solids (e.g., urea). The amount of charged solids, i.e., urea and formaldehyde, in the total mixture should be about 88% or less, the preferred range being 70–88%.

The total mixture thus formed is agitated to attain a uniform mix of the urea and the pH adjusted formaldehyde source. The total mixture is then heated while vigorously agitating to a temperature of between about 85° C. and boiling (which for this mixture occurs at about 117° C.), and preferably between about 85–95° C. This reaction temperature should be attained in a short period of time, for example 5–6 minutes, and the temperature should thereafter be substantially maintained (or at least not raised) with mild agitation of the mix, for at least about 5 minutes and not more than 100 minutes. The substantially reacted mixture so formed is then cooled to about room temperature (approximately 25° C.) in a short period, i.e., 15 minutes or less, to yield a suspension that is stable for at least 30 days. Generally the pH of the suspension will drop from 10–14 during the reaction period and may go as low as about pH 8 before suspension life is impaired, providing the other variables mentioned are controlled.

If it is desired to substantially continuously produce the stable suspension of my invention, as for example in a suitable tank and piping system, a desirable sequence of steps is to prepare a hot concentrated aqueous urea solution, i.e., 80–90%, preferably 83–88% urea by weight, and meter sufficient of the pH adjusting material to bring the pH of the final uncondensed mixture to between about 10 and 14 prior to addition of the formaldehyde source. Another preferred procedure is to add alkaline material both to the urea solution and the formaldehyde source.

In a continuous process, an 80–90% urea solution, containing an inorganic alkaline material, for example KOH, is heated to a temperature of between 180°–220° F. for at least 3 minutes and preferably 6 minutes at 210° F. A hold-up time of at least 3 minutes is considered essential in that it is believed that the urea must react with the hydroxy groups for a period of time if the final product is to remain stable. The amount of inorganic alkaline material added to the urea solution will normally vary between 1–2 mols for every 40 mols of urea. When KOH is used, such an amount will result in an initial pH of at least about 10 and preferably about 13 or more.

The formaldehyde source used in the continuous process may be (1) a U-F 85 mixture (25% urea, 59% $CH_2O$, 16% $H_2O$), (2) a formaldehyde solution of about 37%–85% $CH_2O$ (44–85% solution preferred since less $H_2O$ need be evaporated), (3) solid paraformaldehyde, i.e., solid polymerized $CH_2O$ of 85–98% concentration with 91% $CH_2O$ concentration being the technical grade, and (4) gaseous formaldehyde which is essentially 100% $CH_2O$. When the formaldehyde source contains urea, such as in the U-F 85 solutions, the formaldehyde source should be made alkaline to a pH of above 10 and preferably about 13 by means of a base such as KOH. As a general rule, a base must be added whenever the urea is in solution, whether a straight urea solution or a formaldehyde-urea solution such as a U-F 85 mixture. When the formaldehyde source is devoid of urea, i.e., when solid paraformaldehyde, a straight formaldehyde solution (44%–52% $CH_2O$) or gaseous formaldehyde is used, the formaldehyde source need not be treated with alkali. When the formaldehyde source contains urea, the urea-formaldehyde solution is treated with a base, i.e. KOH, for at least 3 minutes at a temperature of about 140° F. prior to being mixed in the concentrated 80–90% urea solution.

In general, in a continuous process, the formaldehyde source and urea source are combined so that the U/F ratio is between 1.3:1 and 2:1. Preferably the ratio will be 1.6–1.8 mols of urea for each mol of formaldehyde. The reaction time and temperature may vary within close limits. A reaction temperature of 220° F. to 180° F. will correspond to a reaction time of about 15–60 minutes. Usually 20 minutes is the minimum reaction time and 90 minutes would be the maximum at these temperatures.

The stable fluid suspension formed by following my methods can be shipped, stored, etc., to subsequently be introduced into a fertilizer mixing zone containing substantially solid fertilizer materials including acids or acid salts, superphosphates, mono-, di-, and tribasic metaphosphates, and other mono- and diphosphates, ammonium salts, potash, and optionally absorbent materials such as soya bean hull meal, rice hulls, peanut hulls, corn cob fraction, perlite, vermiculite, etc. The acidic fertilizer substrate may be undergoing ammoniation when the suspension is added thereto. Of course, if a non-burning mixed fertilizer product is desired, only sufficient ammonia will be introduced to satisfy the stoichiometric requirements for converting any free phosphoric acid and monocalcium phosphate in the mixing zone to monoammonium phosphate and dicalcium phosphate (reference is again made to Mortenson Patent No. 2,827,368). The pH can then be adjusted to that desired by addition of a nonammoniacal base.

In certain instances the suspension can be used as is a fluid nitrogen source for plants in soils.

A particularly suitable formaldehyde source is a concentrated methylol urea solution having a mol ratio of formaldehyde to urea substantially greater than 1 to 1. A preferred source is a commercially available product known by the trade designation "UF–85" and containing approximately 24% urea, 61% formaldehyde and 15% water. The percentages of ingredients can vary somewhat and still be operable in my process. Other strong formaldehyde sources which are feasible for use in practicing my novel method include concentrated aqueous solution of formaldehyde per se, containing, e.g., from 44–80% formaldehyde. Less concentrated solution such as 37% $CH_2O$ may be used but the additional water present in such dilute solutions requires additional evaporation which obviously is less desirable. A practical problem exists in the use of the concentrated $CH_2O$ solutions in that they must be stored at elevated temperatures to avoid formation of solid paraformaldehyde, a factor which normally adds to the cost and difficulty of operation. However, employment of solid paraformaldehyde in the instant process creates no problems in that the normally solid paraformaldehyde will go into solution at high pH values, i.e., about pH of 13. Since high alkalinity is required in the instant process, the solid paraformaldehyde is readily dissolved. For example, at a pH of about 13 and a solution temperature of about 210° F. the paraformaldehyde will dissolve in about 4–6 minutes. In this connection, by solid paraformaldehyde, I mean solid polymerized formaldehyde of 85–98% concentration. Technical grade (91% $CH_2O$) paraformaldehyde is very satisfactory.

Gaseous formaldehyde may be used and in some instances is preferred.

The mixture of ingredients may be upwardly adjusted in pH by the addition of any inorganic soluble basic reacting material. I prefer to use potassium hydroxide particularly because added plant food material, e.g., $K_2O$, is derived by its use. However, sodium hydroxide, calcium hydroxide, magnesium oxide and other alkali metal and alkaline earth metal hydroxides are feasible for use.

The following examples are for the purpose of illustration only and are not to be considered as limiting the scope of the invention.

*Example I*

7.05 parts water, 36.45 parts UF–85 (60.5% formaldehyde, 26.7% urea and 12.8% water) and 3.52 parts of 6 normal potassium hydroxide were charged into a batching vessel. The above was mixed thoroughly and found to have a pH of 13.1. 52.98 parts of crystalline urea was then added and the entire mixture stirred. While continuing the agitation the mixture was heated and brought to a temperature of 90° C. in 5 minutes. The mixture was then maintained at 90° C. for 32 minutes. It was necessary to use cooling coils to maintain the temperature at 90° C. during the first 10 minutes or so of holding due to the exothermic nature of the reaction between the urea and formaldehyde. At the end of the 32 minute reaction time the resultant suspension was cooled to 25° C. within a ten-minute period. The suspension was pumped to storage. After 70 days the reacted mixture was still a stable fluid suspension.

*Example II*

To 150 grams of UF–85 was added 29 grams of water. This was mixed to a uniform solution. To the diluted UF–85 was added 12 ml. of 6 N potassium hydroxide solution. After this was mixed to a uniform solution the pH was found to be about 13 and 218 grams of crystalline 20 mesh urea was added. The mixture was shaken and stirred until no lumps of wetted urea remained. The mix was a thick slush of urea crystals. The temperature of the mix was 15° C. The urea to formaldehyde mol ratio was about 1.4 to 1 and the mix contained 85% charged solids. Heat was applied to the flask containing this slush and the temperature rose from 15° C. to 90° C. in 5 minutes. The 90° C. temperature was maintained and samples withdrawn periodically, cooled to 25° C. and stored to determine final pH and stability. Table 1 shows the findings in these samples.

It is seen that the time at the elevated temperature should be less than 2 hours if a highly stable suspension is to be prepared.

*Example III*

A water, urea and formaldehyde mixture was prepared as in Example II, with 85% charged solids and a U/F mol ratio of 1.4 to 1. Heat was applied to the slushy mix and the temperature rose from 16° C. to 117° C. (boiling) in 6 minutes. Samples were withdrawn periodically thereafter and cooled to 25° C. The samples were then stored and examined over a period of time for suspension life. The results appear in Table 2.

TABLE 2

| Sample | Minutes | Temp., ° C. | pH | Suspension life |
|---|---|---|---|---|
| Total batch | 0 | 16 | 13 | |
| Do | 6 | 117 | | |
| Do | 8 | 112 | | |
| A | 10 | 112 | 10.1 | 70+ days. |
| B | 14 | 111 | 8.9 | Do. |
| C | 20 | 110 | 9.3 | 5 months. |
| D | 40 | 109 | 9.7 | 1 day. |
| E | 60 | 109 | 9.9 | Do. |

It is seen that with higher temperatures a stable suspension is obtained after a shorter reaction period and the allowable reaction period is lessened.

*Example IV*

Two large batches (1,000 grams) of suspension were prepared in accordance with the method of Example II, at a reaction time between 30 and 47 minutes. The first batch, A, had a pH at that timing of 12.2; the second batch, B, a pH of 12.3. Two complete fertilizer mixtures were prepared wherein batch A and batch B suspensions were introduced during formulation to provide the major amount of nitrogen. The fertilizer made with Suspension B was not used until 45 days after preparation; that with Suspension A not until 75 days after preparation. The suspensions were completely stable at those times. The fertilizer mixtures analyzed 12–5–7 ($N-P_2O_5-K_2O$) and their formulation was according to the following proportions.

|  | Lbs./ton |
|---|---|
| Triple superphosphate | 229 |
| Potassium nitrate | 44 |
| Potassium sulfate | 225 |
| Rice hulls | 755 |
| Anhydrous ammonia | 20 |
| Minor elements | 10 |
| Suspension A (or B) | 785 |

Analysis of the complete fertilizer mixtures and suspensions A and B were as follows:

TABLE 3

|  | Moisture | Total nitrogen | Water Insol. nitrogen | AI | pH | U/F mol Ratio | Percent free urea of total urea |
|---|---|---|---|---|---|---|---|
| Suspension A | 21.4 | 28.61 | 2.09 | 81 | 12.2 |  | 29.1 |
| Complete fertilizer with A | 13.10 | 12.35 | 4.70 | 85 | 6.2 | 1.44 | 25.0 |
| Suspension B |  | 28.71 | 1.58 |  | 12.3 |  | 23.8 |
| Complete fertilizer with B | 9.80 | 11.70 | 6.50 | 58.8 | 6.25 | 1.48 | 17.4 |

TABLE 1

| Sample | Minutes | Temp., ° C. | pH | Suspension life |
|---|---|---|---|---|
| Total batch | 0 | 15 | 13 | |
| Do | 5 | 90 | 13 | |
| A | 7 | 90 | 13 | 6 hours. |
| B | 9 | 90 | 13 | Do. |
| C | 11 | 90 | 13 | Do. |
| D | 14 | 90 | 13 | 24 hours. |
| E | 18 | 90 | 13 | 70+ days. |
| F | 24 | 90 | 13 | Do. |
| G | 30 | 90 | 12.75 | 6 months. |
| H | 47 | 90 | 11.8 | Do. |
| O | 60 | 90 | 9.6 | 70+ days. |
| J | 75 | 90 | 9.4 | Do. |
| K | 90 | 90 | 9.3 | Do. |
| L | 120 | 90 | 9.5 | 12 days. |
| M | 150 | 90 | 9.4 | 4 days. |
| N | 180 | 90 | 9.4 | Do. |

*Example V*

To 122 g. UF–85 was added 44 g. water. This was mixed to a uniform solution. 18 ml. of 6 N potassium hydroxide was then added and thoroughly distributed. Finally 218 g. of crystalline —20 mesh urea was added. The mixture was thoroughly agitated and analyzed 81% solids, 10% KOH, and had a U/F mol ratio of 1.7 to 1. Heat was applied to the mixture and the temperature rose rapidly, reaching 205° F. after 11 minutes. The mixture was then rapidly cooled to about 25° C. The pH was 13.8 and the suspension life was 54 days.

*Example VI*

In this example 230 g. crystalline urea, —16 mesh, 129 g. UF–85, 12 ml. 6 N potassium hydroxide and 30 g. water were mixed in the manner set forth in Example V. The mixture analyzed 88% solids, 12% water, 6.5% of the hydroxide, and had a U/F mol ratio of 1.65 to 1. The reaction temperature was 194° F. and the time of reaction 30 minutes. The suspension prepared had a life of 51 days.

*Example VII*

A solution with the proportions of 69 g. water and 129.5 g. of crystalline −20 mesh urea was continually prepared at about 220° F., the temperature required to preclude salting out of urea. Thereafter 6.7 ml. (8.16 g.) 6 N potassium hydroxide was metered into each above quantity of strong urea solution and immediately thereafter 91.5 g. UF–85 solution was metered into the pH adjusted solution. Cooling was started immediately, the temperature reaching 190° F. in 2 minutes. After a 6 minute reaction period at a temperature of 205° F., the liquid was rapidly cooled to 25° C., the pH was 11.3 and suspension life was 134 days. Another portion of this mix, held for 60 minutes at 205° F., and then cooled to 25° C., had a pH of 8.2 and a suspension life of 36 days. The mix analyzed 70% solids and had a U/F mol ratio of 1.37 to 1.

*Example VIII*

A mixture of 248.5 grams urea, 22 grams water and 12.6 g. 6 N potassium hydroxide was prepared at 220° F. To this hot urea solution a mixture of 80.5 grams paraformaldehyde, 2 grams sodium hydroxide and 41 grams water (prepared at 180° F.) was added in four lots, temperature being controlled during the addition to 225°–230° F. Samples were taken after 5 and 10 minutes' holding at 225° F. and were found to have a pH after reaction of 9.2 and 9.0 respectively. Both samples were stable for 30 days.

*Example IX*

38 g. of water was placed in a 500 ml. 3-necked flask. 218 g. of −16 mesh crystalline urea was added and heated to a clear solution at 100° C. To this solution was added 12 ml. of 6 N sodium hydroxide. Immediately thereafter 122 g. of UF–85 (52° C.) was thoroughly mixed with the other ingredients. The temperature rose in 15 seconds to 228° F. In 45 seconds more, the temperature rose to 238° F. After 2 minutes the temperature of the mix dropped from 236° F. to 205° F. and the pH was 11.4. After 9 minutes holding at 205° F., the pH was 10.5 and after cooling to 25° C. the suspension life was 49 days. The U/F mol ratio in this instance was 1.7 to 1, and the solids content was 83%.

*Example X*

616 g. of urea, 31.5 g. of water, and 56.7 g. of 6 N potassium hydroxide were mixed and heated to 220° F. 345 g. of UF–85, 50.7 g. of water and 10.7 g. of 6 N potassium hydroxide were mixed and heated to 180° F. The UF–85 containing mixture was added, about one-third at a time, to the hot urea solution. It was necessary to carefully control and cool the mixture during addition to make sure the temperature did not go above 240° F. Three minutes after addition of all ingredients the temperature was 193° F. It was thereafter held at 194–195° F. and the following samples taken, cooled after the separated holding period and each found to be stable for more than 30 days.

TABLE 4

| Sample | Holding time, min. | Holding temp., °F. | pH |
|---|---|---|---|
| A | 5 | 195 | 8.4 |
| B | 9.5 | 194 | 8.9 |
| C | 13 | 194 | 9.1 |
| D | 17.5 | 194 | 9.1 |
| E | 25 | 195 | 9.4 |

The U/F mol ratio here is approximately 2.73 to 1.

*Example XI*

A mixture of 218 g. of urea and 25 g. of water was mixed at 230° F. Thereafter 15 g. of 6 N potassium hydroxide and 16.3 g. of K$_2$HPO$_4$ (a buffering material) was added (at 115° F.). Subsequently 123 g. of UF–85 diluted with 18 g. of water was added. Cooling was commenced immediately. After 2 minutes the temperature was 195° F. and was maintained at this point for the reaction period. Samples taken after 20 and 25 minutes were found to have a pH of 10 and 9.7, respectively, and were stable for 31 and 40 days, respectively.

*Example XII*

854 g. per minute of a UF–85 solution (25% urea, 59% formaldehyde and 16% water) and 34 g. per minute of a 45% potassium hydroxide solution was pumped into a closed, steam-heated tank and agitated and reacted for about 6 minutes at a temperature of about 140° F. At the same time, 1,310 g. per minute of an 85.8%, by weight, urea solution and 66 g. per minute of a 45% potassium hydroxide solution was charged into an open, jacketed, steam-heated tank wherein the contents were agitated and reacted for about 6 minutes at a temperature of about 210° F. The contents of the two tanks were transferred to an open-hooded exhaust, jacketed tank. The urea-KOH and U-F 85-KOH mixture is agitated and held at a temperature of about 210° F. for 9 minutes. The exothermic heat of reaction was removed by means of cooling water. During this 9-minute hold-up, 31 g. per minute of water vapor was removed from the system. The reaction mixture was next transferred to an open, insulated tank having spiral channels and overflow and underflow baffles. Such an arrangement is equivalent to 25 tanks. The reaction mixture was held in the channeled, baffled tank for about 23 minutes at a temperature of between about 190° F. and 210° F. The reaction mixture was then passed through a conventional shell and tube heat exchanger wherein 2,233 g. of finished product exited at about 70° F. In some runs, cold water (37° F.) was used in the heat exchanger and it was noted that no coating of the product on the walls took place.

ANALYSIS OF FINISHED PRODUCT SO MADE AND AFTER 9 MONTHS

| | Viscosity, cp. | TN | CH$_2$O | U/F mol ratio | K$_2$O | H$_2$O | pH |
|---|---|---|---|---|---|---|---|
| Uniform suspension as made | 80 | 27.85 | 22.36 | 1.34:1 | 1.70 | 15.94 | 10.2 |
| Uniform suspension 9 months old | 180 | 27.85 | 22.36 | 1.34:1 | 1.70 | 15.94 | 9.1 |

*Example XIII*

2,101 g. per minute of an 85.95% by weight urea solution and 124 g. per minute of a 45% potassium hydroxide solution were charged into an open, jacketed, steam-heated tank. The ingredients were reacted under agitation for about 6 minutes at a temperature of about 210° F. The contents were transferred to an open-hooded, exhaust, jacketed tank and 530 g. per minute of solid paraformaldehyde (91% CH$_2$O) was charged in. During the nine-minute hold-up reaction period, the contents were agitated and the heat of reaction was removed by means of cooling water so that the reaction temperature was about 210° F. During the nine-minute hold-up reaction period, 99 g./minute of water vapor was evaporated. The reaction mass was then transferred to an open, insulated tank and further reacted at a temperature of between about 210–190° F. for 23 minutes. This reaction tank comprised spiral channels with overflow and underflow baffles to prevent any short-circuiting of the continuous fluid increment of flow. The reaction mass was then passed through a shell and tube heat exchanger and 2,656 g./min. product exited with a temperature of about 68° F. Analysis of the product is:

| | Viscosity, cp. | TN | CH₂O | U/F mol ratio | K₂O | H₂O | pH |
|---|---|---|---|---|---|---|---|
| As made; crystal-clear solution | 55 | 31.69 | 18.16 | 1.87/1 | 2.10 | 11.74 | 8.9 |
| After 6 months; crystal-clear solution | 210 | 31.69 | 18.16 | 1.87/1 | 2.10 | 11.74 | 8.8 |

*Example XIV*

2,043 g. per minute of an 88% urea solution along with 94 g. per minute of 45% KOH solution were reacted at 210° F. for about 6 minutes. 1,075 g. per minute of a 52% formaldehyde solution was added and the mixture agitated for an additional 8 minutes. The reaction mixture was then transferred to a spiral vacuum evaporator for an additional reaction time of 22 minutes. The conditions in the first group of spirals was 600 mm. vacuum at 200° F. and about 720 mm. vacuum in the last group of spirals. The product had a viscosity of 150 cp., total nitrogen of 31.14, formaldehyde of 21.05, a U/F mol. ratio of 1.59, a $K_2O$ content of 1.30, an $H_2O$ content of 9.72 and a pH of 9.8.

*Example XV*

2,064 g. per minute of an 83% urea solution and 143 g. per minute of a 45% KOH solution were reacted for 6 minutes at a temperature of about 205° F. The reaction mass was transferred to a pressure tank and 519 g. per minute of gaseous formaldehyde was introduced. The contents were held-up for 10 minutes at a temperature of 210° F. and then transferred to a reaction spiral where they continued to react for an additional 22 minutes at temperatures between 190° F. and 210° F. After passing through a heat exchanger the product was analyzed and possessed the following characteristics: viscosity 65 cp., total nitrogen 29.50, formaldehyde 19.11, $K_2O$ 1.99, U/F mol. ratio of 1.66, $H_2O$ 15.05 and a pH of 9.1.

*Example XVI*

1,820 g. per minute of an 84.9% urea solution and 130 g. per minute of a 50.6% KOH solution were reacted for 6 minutes at a temperature of 200° F. to 210° F. and then cooled to 180° F. The reaction mass was transferred to a closed reactor with a vent condenser and 960 g. per minute of a 49.3% formaldehyde solution was added and the mixture agitated for an additional 8 minutes at a temperature of 210° F. to 200° F. The reaction mixture was then transferred to a vessel with baffled flow and reacted an additional 14 minutes at 200° F. The dilute product containing 28.4% water was then transferred to a flash vacuum evaporator where 515 g. per minute condensate water was removed. The concentrated product was passed through a heat exchanger and cooled to about 80° F. The product had the following analysis: total nitrogen 30.06, formaldehyde 19.48, $K_2O$ 2.60, U/F mol. ratio of 1.66, $H_2O$ 12.92 and a pH of 9.4.

Obviously many modifications and variations of the invention as hereinbefore set forth may be made without departing from the spirit and scope thereof and therefore only such limitations should be imposed as are indicated in the appended claims.

I claim:

1. A composition comprising a flowable mixture of substantially uncondensed urea, formaldehyde, water, and a sufficient amount of an inorganic alkaline material to impart a pH of between about 10 and 14 to said mixture, said mixture having a temperature above 85° C., a urea to formaldehyde mol ratio of between about 1.3 and 2.75 to 1 and containing not more than about 88% solids, said composition being substantially stable for at least 30 days.

2. A substantially reacted pumpable fluid suspension of urea and formaldehyde, said suspension having a urea to formaldehyde mol ratio of between about 1.3 and 2.75 to 1, a pH between about 8 and 14, and containing not more than about 88% solids, said suspension being formed by reacting urea and formaldehyde at a pH of above about 10 for at least about 5 minutes at a temperature above about 85° C. whereby a urea-formaldehyde suspension is formed which is stable for at least 30 days.

3. A method of preparing a substantially stable suspension of urea and formaldehyde which is a flowable mixture at ambient temperature for at least about 30 days which comprises: preparing a flowable mixture of urea, formaldehyde, water, and a sufficient amount of an inorganic alkaline material so as to raise the pH of the mixture above 10, said mixture having a urea to formaldehyde mol ratio of between about 1.3 to 1 and 2.75 to 1; maintaining said mixture at a reaction temperature above about 85° C. for at least about 5 minutes, and cooling the resultant suspension to about room temperature.

4. The method of preparing a substantially stable suspension of urea and formaldehyde which is a flowable mixture at ambient temperature for at least about 30 days which comprises: upwardly adjusting the pH of a formaldehyde source to at least about 10 by adding a soluble inorganic basic reacting material, preparing a substantially uncondensed mixture of urea, formaldhehyde and water by adding sufficient urea to said pH-adjusted formaldehyde source to bring the urea to formaldehyde mol ratio to between about 1.3 to 1 and 2.75 to 1, obtaining a reaction temperature in said substantially uncondensed mixture of between about 85° C. and boiling, maintaining said mixture at about said reaction temperature for at least about 5 minutes, whereby a substantially stable suspension of urea and formaldehyde is formed.

5. The method of substantially continuously preparing a substantially stable suspension of urea and formaldehyde which suspension remains as a flowable mixture at ambient temperatures for at least 30 days which comprises: continuously preparing a concentrated aqueous solution of urea, adding to said solution a sufficient amount of an inorganic alkaline material so as to raise the pH of the solution above 10, thereafter adding a sufficient amount of a formaldehyde source to bring the urea to formaldehyde mol ratio of the resultant mixture to between about 1.3 and 2.75 to 1; maintaining said mixture at a reaction temperature between about 85° C. and boiling for at least 5 minutes, whereby a substantially stable suspension of urea and formaldehyde is formed.

6. The method of preparing a free-flowing mixed fertilizer of high nitrogen content, a substantial amount of said nitrogen content being supplied by water-insoluble urea-formaldehyde condensation products, which comprises: introducing a substantially reacted stable fluid suspension of urea and formaldehyde having a urea to formaldehyde mol ratio of between about 1.3 and 2.75 to 1, a pH of between about 8 and 14, and containing not more than about 88% solids, said suspension being formed by reacting urea and formaldehyde at a pH of above 10 for at least about 5 minutes at a temperature above about 85° C., to a substantially dry acidic fertilizer solids substrate, tumbling said substrate containing said suspension, and curing the resulting mixed fertilizer whereby is produced a mixed fertilizer having an acidic pH and containing substantial amounts of water-insoluble urea-formaldehyde condensation products.

7. A method for preparing a substantially stable suspension of urea and formaldehyde which suspension remains pumpable for at least 30 days which comprises: treating a urea solution of with 1–2 mols of an inorganic alkaline material per 40 mols of urea, reacting said urea solution with a formaldehyde source at a pH above about 10 and at a ratio of urea to formaldehyde of about 1.3–2.75 to 1 at a temperature between about 85° C.

and boiling for at least about 20 minutes, whereby a stable urea formaldehyde suspension is formed.

8. The method of claim 7 wherein the formaldehyde source is an aqueous solution of 44%–85% formaldehyde.

9. A method for preparing a substantially stable suspension of urea and formaldehyde which suspension remains pumpable for at least 30 days which comprises: mixing and reacting, at a pH above about 10, a 44%–85% aqueous formaldehyde solution with urea, said urea and formaldehyde being present in a U/F mol ratio of about 1.3–2.75 to 1, said reaction being carried out at a temperature of between 85° C. and boiling for at least about 20 minutes, whereby a substantially stable suspension of urea and formaldehyde is formed.

References Cited by the Examiner

UNITED STATES PATENTS

| | | | |
|---|---|---|---|
| 2,467,212 | 4/1949 | Kvalnes | 260—553 |
| 2,592,809 | 4/1952 | Kralovie et al. | 260—69 |
| 2,766,283 | 10/1956 | Darden | 260—553 |
| 2,864,685 | 12/1958 | Waters et al. | 71—29 |
| 2,916,371 | 12/1959 | O'Donnell | 71—28 |
| 2,955,930 | 10/1960 | Kealy | 71—29 |
| 3,096,168 | 7/1963 | Waters et al. | 71—28 |

DONALL H. SYLVESTER, *Primary Examiner.*